(12) United States Patent
Balakrishnan et al.

(10) Patent No.: US 7,054,562 B1
(45) Date of Patent: May 30, 2006

(54) METHOD AND SYSTEM FOR SUPPRESSING ASE ON A WDM NETWORK

(75) Inventors: Sridhar Balakrishnan, Ellicott City, MD (US); Vipul Bhatnagar, Kensington, MD (US)

(73) Assignee: CIENA Corporation, Linthicum, MD (US)

( * ) Notice: Subject to any disclaimer, the term of this patent is extended or adjusted under 35 U.S.C. 154(b) by 918 days.

(21) Appl. No.: 10/062,261

(22) Filed: Feb. 1, 2002

(51) Int. Cl.
*H04J 14/02* (2006.01)

(52) U.S. Cl. .............................. 398/83; 398/82; 398/84; 398/85

(58) Field of Classification Search ............. 398/82–88
See application file for complete search history.

(56) References Cited

U.S. PATENT DOCUMENTS

| | | | |
|---|---|---|---|
| 5,532,864 A | 7/1996 | Alexander et al. | 359/177 |
| 6,025,941 A | 2/2000 | Srivastava et al. | 359/119 |
| 6,323,975 B1 | 11/2001 | Kurki | 359/127 |
| 6,388,802 B1 * | 5/2002 | Allan | 359/337 |
| 2002/0039226 A1 * | 4/2002 | Murakami et al. | 359/337 |
| 2002/0093707 A1 * | 7/2002 | Katagiri et al. | 359/124 |

* cited by examiner

*Primary Examiner*—Jason Chan
*Assistant Examiner*—David Lee
(74) *Attorney, Agent, or Firm*—Dougherty Clements; Christopher L. Bernard; Tyler S. Brown

(57) ABSTRACT

A method and apparatus for assigning channel bands to a wavelength division multiplexed (WDM) system is disclosed. The WDM system includes an arrangement of optical amplifiers, banded optical add-drop multiplexers (OADMs) having blocking filters, and a tunable edge filter. The channel band assignment method suppresses amplified stimulated emissions (ASE) in a partially populated system in which at least one of the blocking filters is not in the transmission path. Channel bands are assigned from one edge of an amplified transmission window to the other in a sequential order and the tunable edge filter is adjusted to attenuate ASE wavelengths not blocked by the blocking filters as channels are assigned. A channel decommissioning method is also disclosed which employs similar techniques and the tunable edge filter to suppress ASE as blocking filters are removed or otherwise deselected from the transmission path.

25 Claims, 11 Drawing Sheets

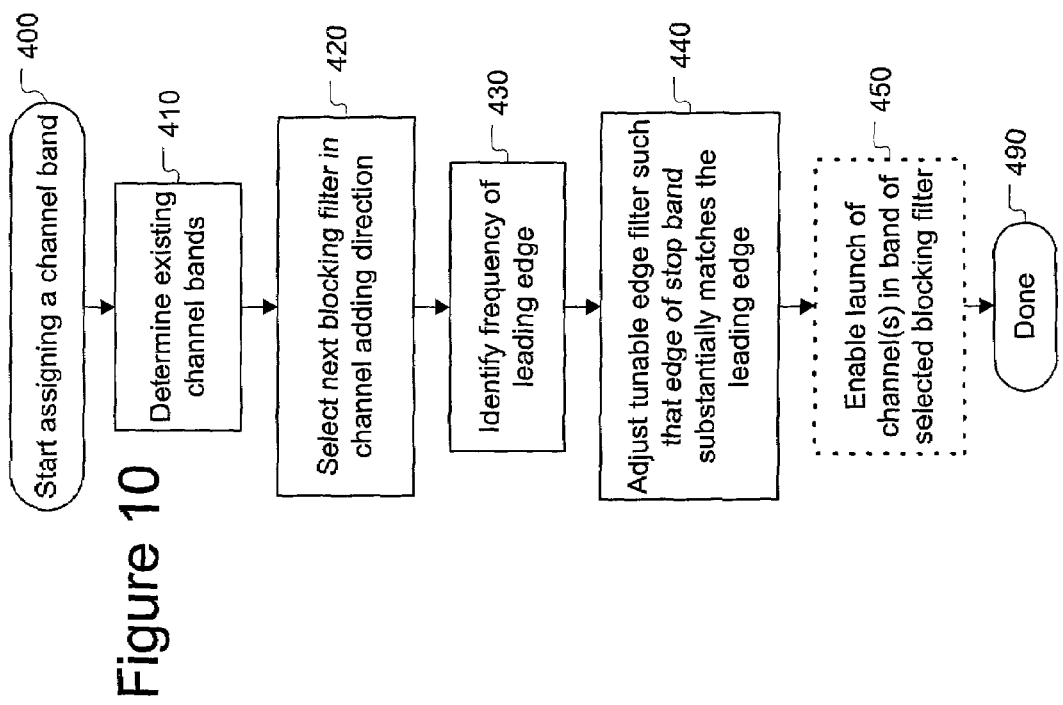

METHOD AND SYSTEM FOR SUPPRESSING ASE ON A WDM NETWORK

BACKGROUND OF THE INVENTION

1. Field of Invention

The invention generally relates to a method and system for improving an optical communications network. More particularly, the invention relates to a method and system that suppresses ring lasing or ASE (amplified stimulated emission) peaking in a wavelength division multiplexed (WDM) optical communications network.

2. Description of Related Art

Wavelength Division Multiplexing (WDM) is used to transmit a plurality of optical channels via an optical wave guide medium where each channel carries information signals within a network or system. Each channel within the WDM signal is associated with a particular wavelength (actually, each channel includes a range of wavelengths but is commonly referred to using its center wavelength), thereby increasing the information capacity of fiber optic systems. Such optical systems include, for example, local area networks (LANs), telecommunication systems and cable television systems. Depending on the optical system configuration and the transmission path, various optical and/or electrical amplifiers are required to provide the necessary optical power to efficiently transmit and amplify the WDM signal to each component within the network.

WDM optical networks have traditionally been used for long haul point to point (linear) networks. However, with the increasing demands on communication systems, WDM optical networks can also be used in smaller system configurations, such as local or regional telephone or data networks. In these systems, communication signals are usually transmitted over a limited geographic area to various nodes within a network. A particular node can be configured to drop one or more information bearing or payload channels from the WDM signal, process the information contained in the dropped channels and add the channels containing new information to the WDM signal for transmission to other nodes in the network.

An optical add/drop multiplexer (OADM) is typically be used at a node to drop one or more channels from the WDM signal while permitting the remaining channels (express channels) to continue on the optical transmission system. Channels may be added to the WDM signal downstream of the dropped (blocked) channels.

To drop a channel, an optical blocking filter is used to filter out the channel(s) being dropped from the WDM signal. Various forms and types of such blocking filters are used such as a fiber Bragg gratings (FBG), thin film filters, etc. Such blocking filters are typically transmissive with respect to the express channels (those channels passing through the OADM) and reflective with respect to the dropped channels. U.S. Pat. No. 5,748,349 illustrates one example of a known OADM that utilizes a series of Bragg gratings to drop channels.

In metropolitan or regional areas, WDM systems having a ring configuration can be used to provide high capacity data links between several nodes. In other words, WDM networks may be configured in a ring topology in which the channel wavelengths may circulate around the ring. Such ring topologies are typically utilized in metropolitan areas. WDM rings carry multiple optical signals (channels) on a looped optical communication path.

It is also customary for wavelengths to be dropped ("blocked") from the ring by placing an optical filter on the ring. Such a blocking filter presents a large loss in the transmission path over its wavelength interval of interest (stop band), over and above the ring's fiber loss. Each unique wavelength placed on a ring will have an associated filter to drop it from the ring.

Unused wavelengths, however, may not have associated blocking filters deployed on the ring and so the ring's transmission loss at these wavelengths is the same as the fiber loss.

Fiber optic ring networks may employing optical amplifiers (OAs) to overcome the transmission losses associated with the fiber and optical elements situated on the ring. While OAs compensate for transmission loss by amplifying the signals present on the ring, they also generate noise (ASE) over the entire spectrum of the OAs bandwidth. ASE power lying within the blocking filter's stop band is attenuated. If portions of the optical spectrum are not blocked, then ASE at those unblocked wavelengths will re-circulate around the ring. If the round-trip gain of the ring exceeds unity, then the ASE power at unblocked wavelengths will increase due to positive feedback. The ASE power that grows under such conditions may actually cause lasing, but more commonly, it simply creates power fluctuations for the signals carried on the ring. These power instabilities may disrupt the useful signals' quality of transmission and are undesirable.

SUMMARY OF THE INVENTION

An embodiment of the invention includes an arrangement of optical amplifiers, banded optical add-drop multiplexers (OADMs), a tunable edge filter, a fiber-optic ring network and a wavelength assignment method that suppresses ASE on a WDM system, thereby eliminating signal amplitude instabilities. The WDM system may be a ring-based architecture having a recirculation path or a linear network architecture.

Another embodiment of the invention includes a wavelength division multiplexed optical communication system having a transmission path carrying a WDM signal with a plurality of channel bands, comprising an optical amplifier optically coupled to the transmission path of the system and having an associated amplified transmission window; a plurality of optical add-drop multiplexers each including a drop filter with an associated drop band capable of dropping at least one channel band from the WDM signal; said optical add-drop multiplexers injecting the channel bands into said fiber optic network such that the injected channel bands occupy a first edge portion of the amplified transmission window; a tunable edge filter optically coupled to the transmission path, said tunable edge filter having a pass band and a stop band; and a network manager operatively connected to said tunable edge filter, said network manager adjusting said tunable edge filter such that the stop band of the tunable edge filter substantially blocks ASE wavelengths of unoccupied channel bands.

The WDM system may be a ring-based system and the transmission path is recirculation path. The WDM system may also be a linear system having a linear architecture.

Another embodiment of the invention includes a wavelength assignment method that suppresses ASE on a WDM system having a transmission path with an amplified transmission window, comprising: assigning a first group of channels to a first channel band occupying a first edge portion of the amplified transmission window; assigning a second group of channels to a second channel band substantially adjacent to the first channel band in a channel adding direction, wherein the channel adding direction is away from the first edge portion of the amplified transmission window; and adjusting a tunable edge filter in the transmission path such that a stop band of the tunable edge filter substantially blocks ASE wavelengths of unassigned channel bands.

Yet another embodiment of the invention includes a wavelength decommissioning method that suppresses ASE on a WDM system having a transmission path with an amplified transmission window transmitting a plurality of channels bands assigned to a first edge portion of the amplified transmission window, the method comprising: decommissioning a first channel band from among the plurality of channel bands, the first channel band being substantially adjacent to a second channel band in a channel deleting direction, wherein the channel deleting direction is towards the first edge portion of the amplified transmission window; and adjusting a tunable edge filter in the transmission path such to expand a stop band of the tunable edge filter to substantially block ASE wavelengths of the decommissioned first channel band.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below and the accompanying drawings which are given by way of illustration only, and thus are not limitative of the present invention, and wherein:

FIG. 10 is a high level flowchart implementing the inventive wavelength assignment method and edge filter tuning for the addition of a new channel band;

FIG. 11 is a high level flowchart implementing the inventive wavelength assignment method and edge filter tuning for the decommissioning of an existing channel band;

DETAILED DESCRIPTION OF INVENTION

The following detailed description of the invention refers to the accompanying drawings. The same reference numbers in different drawings identify the same or similar elements. Also, the following detailed description does not limit the invention. Instead, the scope of the invention is defined by the appended claims and equivalents thereof.

The expression "optically communicates" as used herein refers to any connection, coupling, link or the like by which optical signals carried by one optical system element are imparted to the "communicating" element. Such "optically communicating" devices are not necessarily directly connected to one another and may be separated by intermediate optical components or devices. Likewise, the expressions "connection" and "operative connection" as used herein are relative terms and do not require a direct physical connection.

Figure 1:
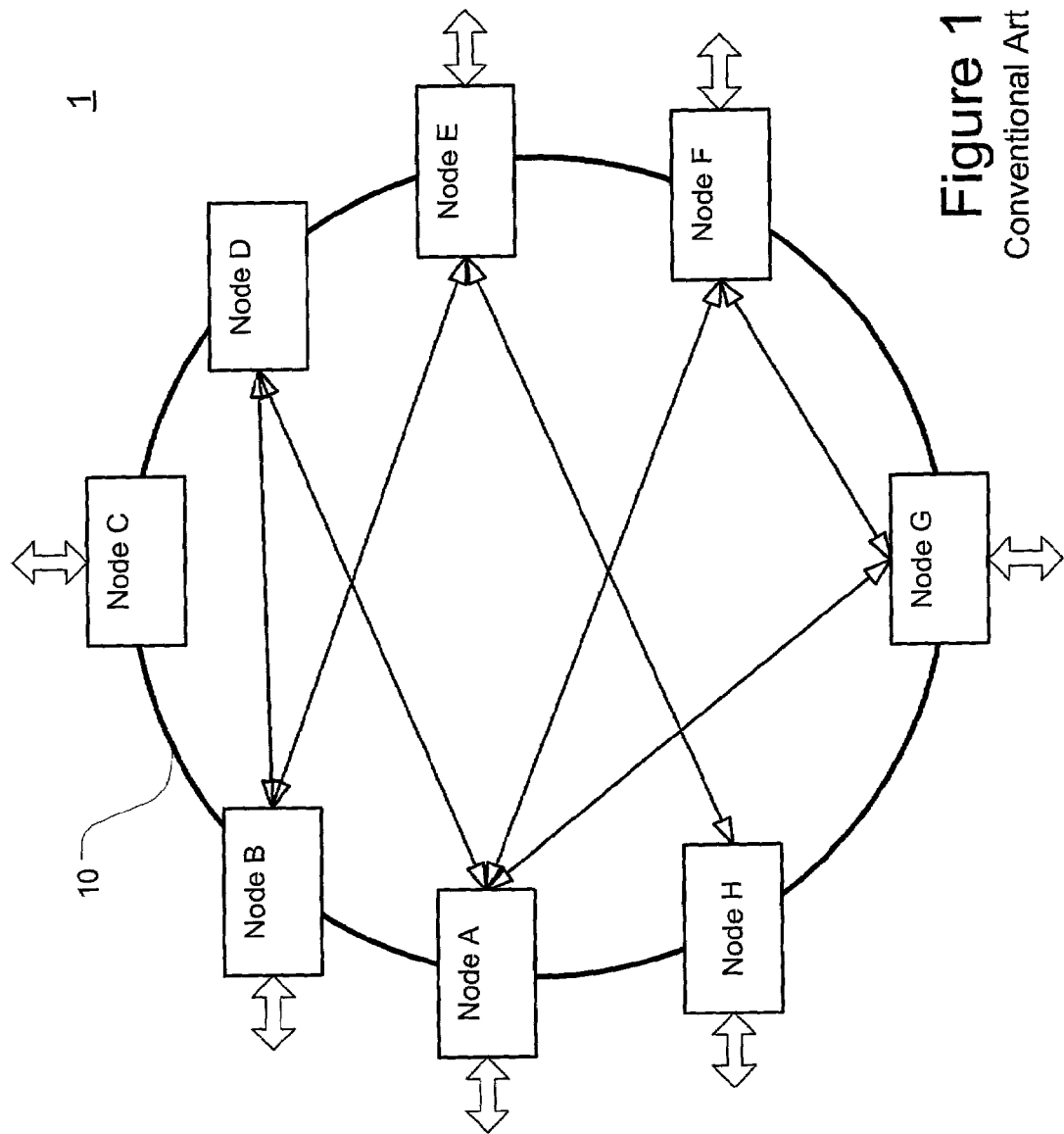
FIG. 1 is a block diagram of a conventional WDM ring architecture.

FIG. 1 illustrates a typical and conventional ring based system 1. Nodes A,B,C,D,E,F,G and H are add/drop locations, where channels are added and dropped on the system 1. Lengths of optical fiber 10 connect the various nodes A–H in a ring-shaped topology. The arrows indicate different communication links from node to node and between nodes and different systems and may be implemented by various conventional optical connections and switching devices to route the channels to the proper destination. As mentioned above, such a conventional ring system 1 may carry a WDM signal.

Figure 2:
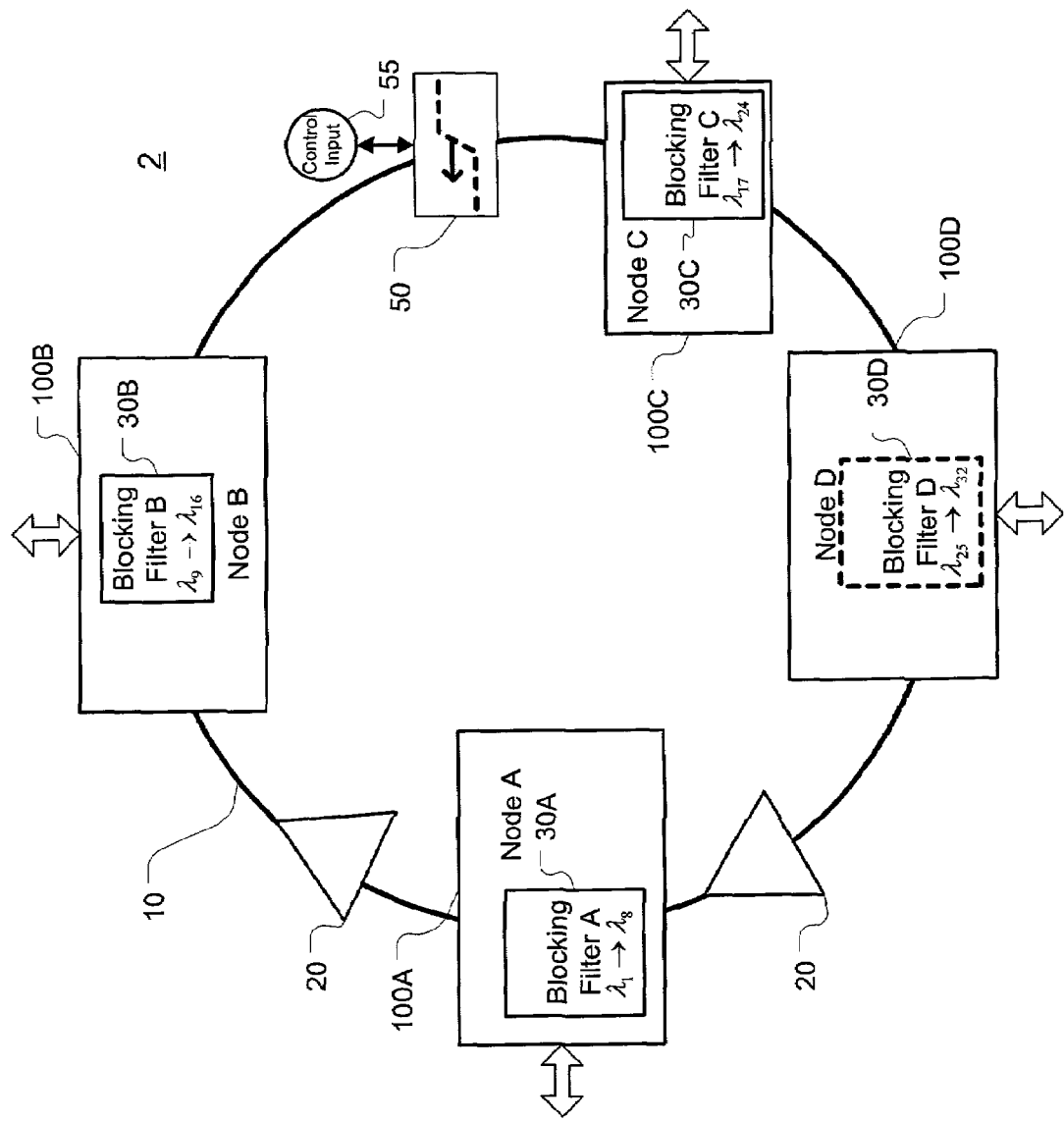
FIG. 2 is a block diagram of a WDM system according to the invention having a ring architecture.

FIG. 2 illustrates the inventive WDM transmission system 2 including nodes A, B, C, and D (100A, 100B, 100C, and 100D) in which lengths of optical fiber 10 connect the nodes in a ring-based architecture. Although not shown the system 2 may also include conventional optical communication links from node to node as in FIG. 1. The nodes 100 include any known or future developed optical add/drop multiplexer (OADM) and any known or future developed optical device capable of at least dropping one or more WDM channels. A non-limiting sampling of such known OADMs may be found in U.S. Pat. Nos. 5,748,349; 5,778,118; 6,002,503; 6,069,719; and 6,243,179.

The only requirement of an OADM and node 100 for inclusion in the inventive systems is a blocking filter 30 as further shown in FIG. 2. The blocking filter 30 may be constructed, as also known in the art, using any device capable of filtering a channel band (e.g. fiber Bragg gratings, dielectric thin film filters, interference filters, arrayed waveguide gratings (AWGs), wavelength selective switches, etc). Such blocking filters typically reflect certain wavelengths (e.g. the wavelengths being dropped) while permitting the remainder to be transmitted. In this way, a channel band may be blocked from the WDM signal and routed to another optical path.

Preferably, the blocking filters 30 drop a band of channels. As illustrated using double headed arrows for the nodes 100, the WDM ring system 2 is generally capable of dropping bands of channels at various points. Such a channel-band architecture is employed to minimize the express loss on the system. Express loss is the loss experienced by channels passing through an optical network element as opposed to the loss experienced by channels being dropped or added to the WDM signal path. Channel band filters which drop multiple wavelengths, as opposed to individual channel filters, are fewer in number and generally result in lower express losses. Generally speaking, however, the band size of the blocking filters 30 can correspond from 1 to N wavelengths depending on the system.

At least one of the nodes 100 must also be capable of adding channels to the WDM signal on the network 10 otherwise no traffic would be carried on the system 2. Although channels are typically added at the same node 100 in which they are dropped this is not a requirement: once a channel is dropped the wavelength range occupied by that channel is generally available such that any downstream node 100 may add channel(s) to that range.

Typical OADMs generally have the ability to both add and drop channels. Because the invention focuses on the blocking filters 30 or lack thereof in a partially populated system, a detailed description of channel adding devices and specific architecture of the OADM nodes 100 is not necessary. For the purposes of this invention a "partially populated system" is one in which less that the total number of channel bands and corresponding blocking filters 30 are present. This is illustrated in FIG. 2 where the flocking filter 30D is shown in dotted lines indicating that it has not been installed or otherwise switched into the transmission path such that it is capable of dropping its associated channel band (e.g. $\lambda_{25} \rightarrow \lambda_{32}$).

Figure 4:
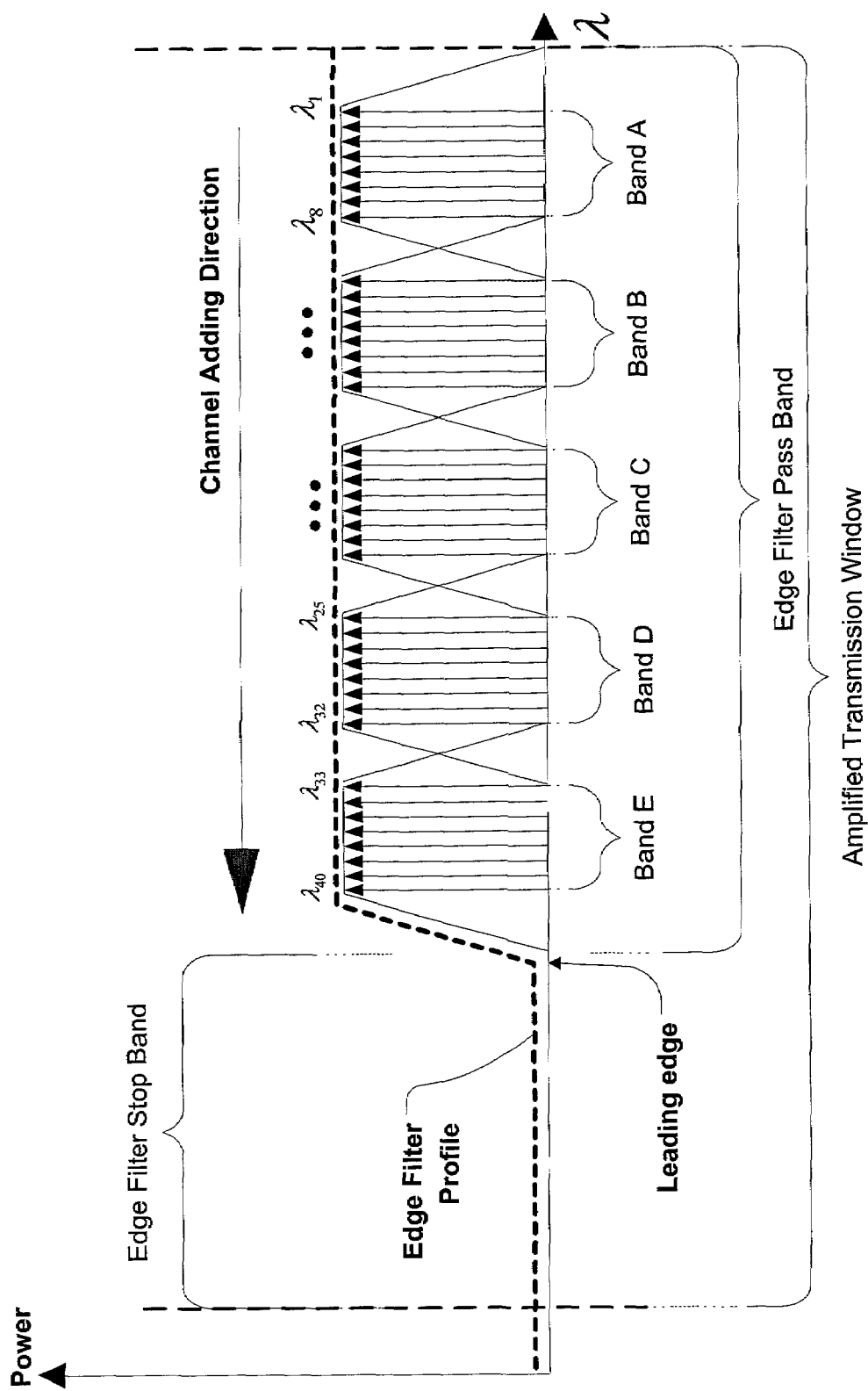
FIG. 4 is a graph of wavelength versus power illustrating the wavelength assignment method and edge filter tuning concepts of the invention.
Figure 5:
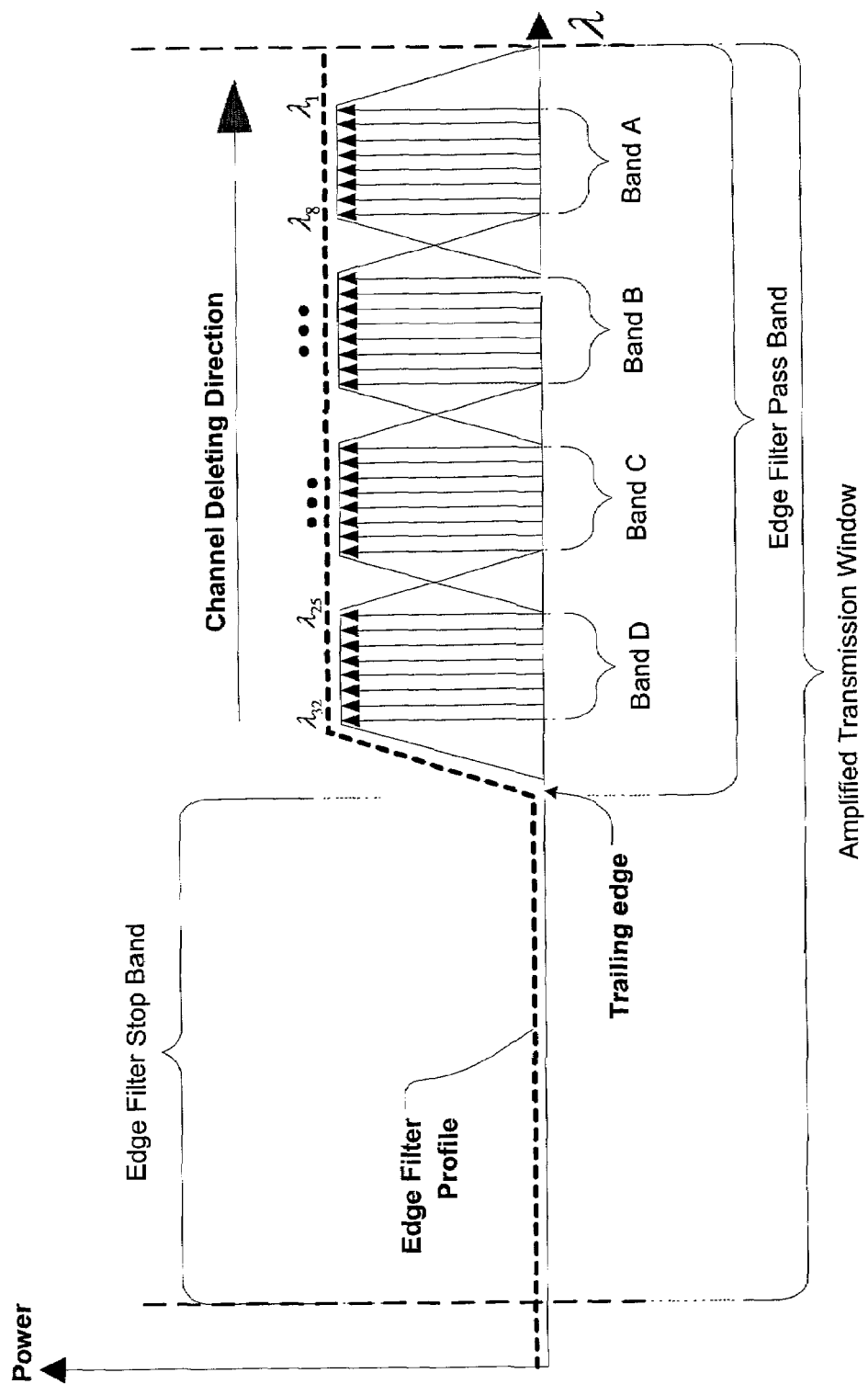
FIG. 5 is a graph of wavelength versus power further illustrating the wavelength assignment method and edge filter tuning concepts of the invention.
Figure 6:
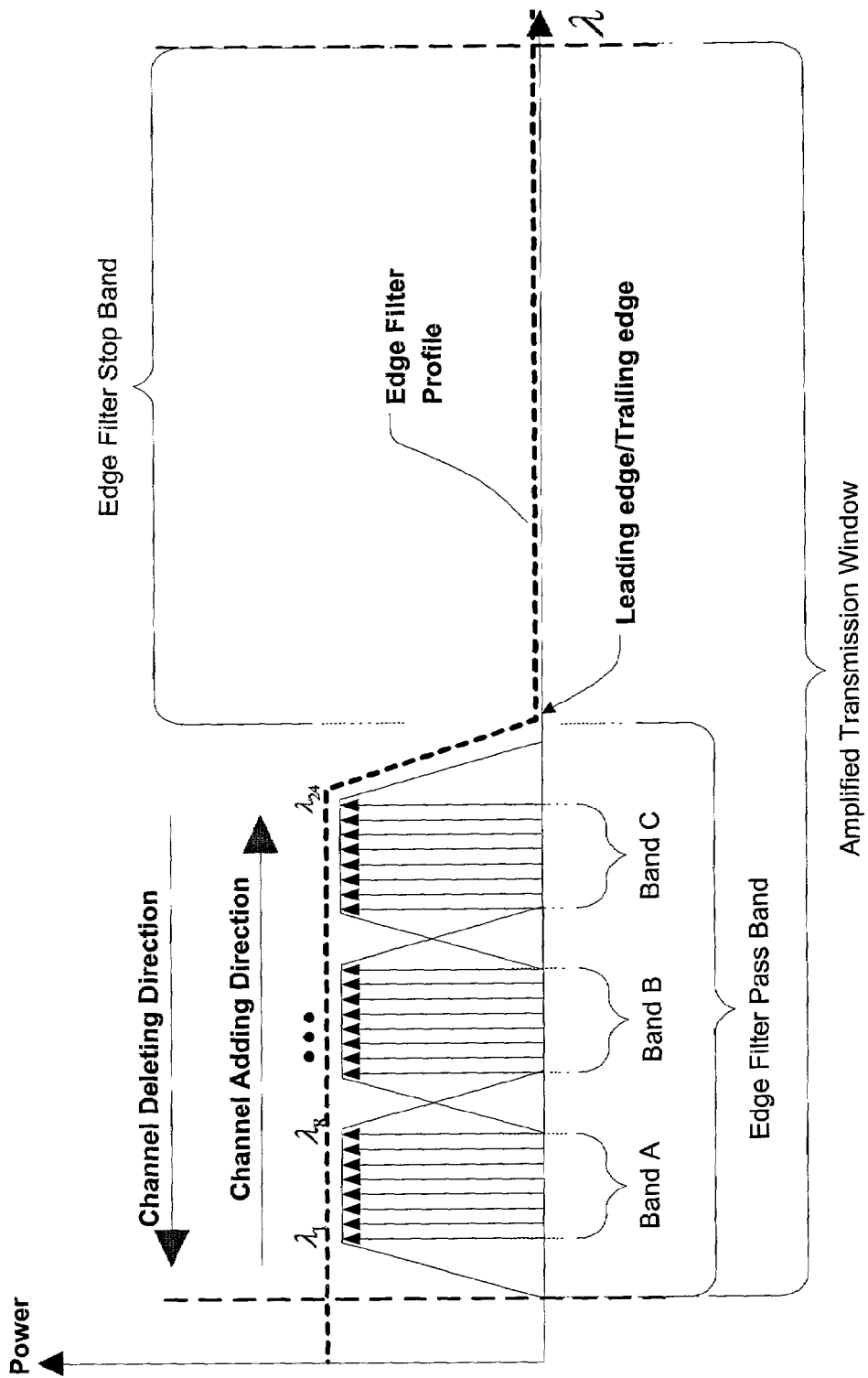
FIG. 6 is a graph of wavelength versus power still further illustrating the wavelength assignment method and edge filter tuning concepts of the invention.

Continuing with the inventive architecture shown in FIG. 2, a tunable edge filter 50 is disposed on the transmission path of the system 2. The tunable edge filter 50 receives the WDM signal on transmission path of system 2 and filters the WDM signal according to an edge filter profile as shown in FIGS. 4–6 and further discussed below. The tunable edge filter 50 may be placed anywhere on the transmission path of system 2. In more complex system architectures having multiple signal transmission paths it is generally sufficient to place the tunable edge filter 50 on a recirculation path which is defined as a segment of the network in which a signal may recirculate. If more than one recirculation path is present then a tunable edge filter 50 may be disposed on each such recirculation path.

Figure 12:
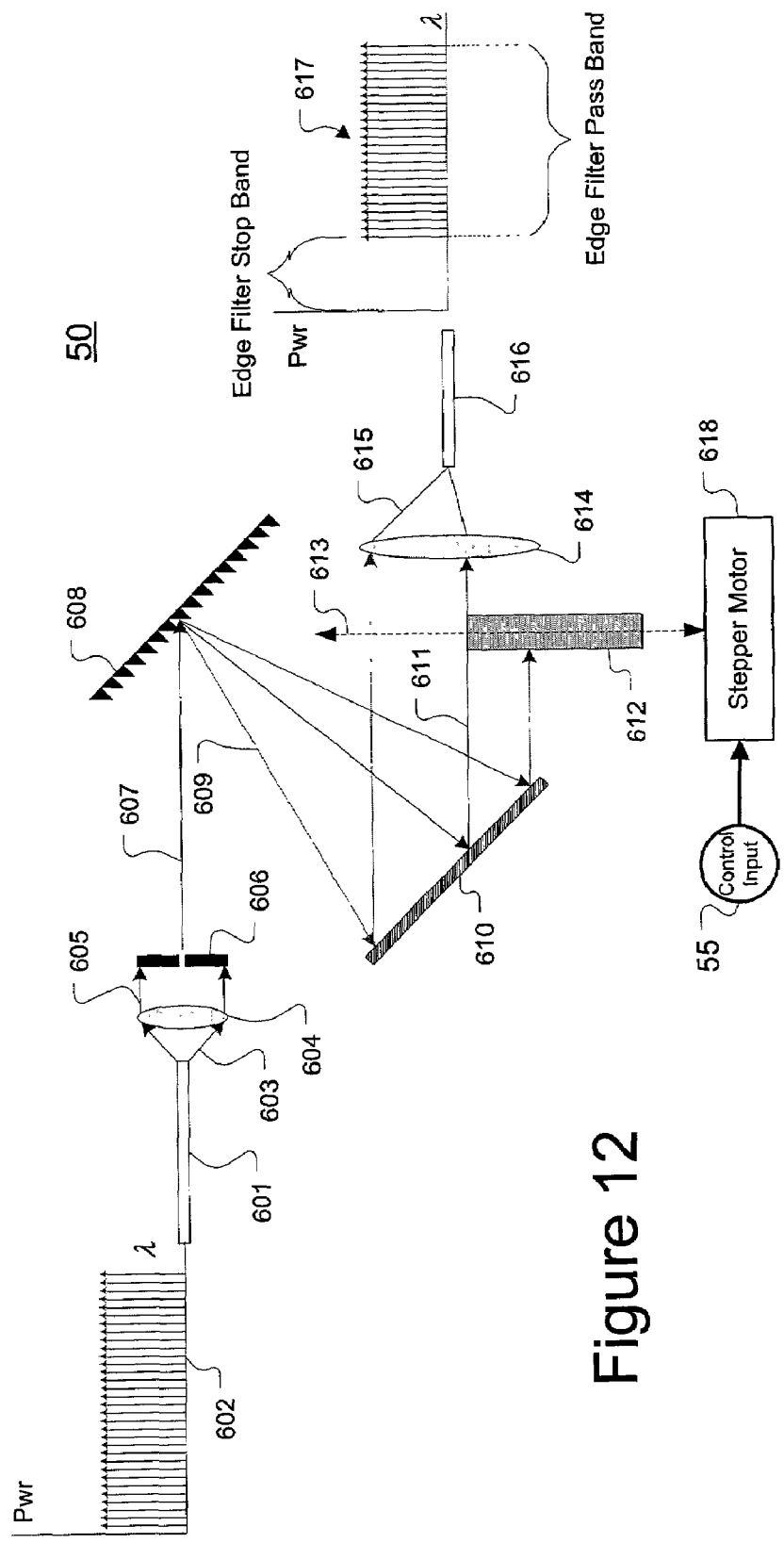
FIG. 12 is a block diagram of a tunable edge filter that may be utilized in the invention.

The tunable edge filter 50 may be realized as illustrated in FIG. 12. The input fiber 601 and output fiber 616 may be spliced into the fiber 10 or connected using a variety of optical connectors as is known in the art. As further shown in FIG. 12, the WDM signal carried in the input fiber 601 of tunable edge filter 50 is composed of multiple wavelengths 602, each wavelength carrying an associated data signal. Light emerges from the input fiber 601 in a cone-shaped beam 603 which is subsequently collimated 605 by a lens 604. An aperture 606 may be used to limit the width of the beam incident upon the diffraction grating 608. Each wavelength within the incident beam 607 is dispersed at a unique angle.

A mirror 610 which is disposed at an appropriate angle collects the dispersed wavelengths 609 and reflects them 611 towards a focusing lens 614. A beam stopper 612 is placed before the focusing lens 614 and may partially block a continuous portion of the beam 611 incident upon the focusing lens 614. The position of beam stopper 612 effectively determines which wavelengths are incident upon lens 614. The beam stopper's position may be adjusted along the linear direction 613 by a stepper motor 618 or other equivalent device to vary the transition wavelength of the device 50. Those wavelengths which are not blocked by beam stopper 612 are focused by lens 614 into a beam 615 which is incident upon the output fiber 616. An illustrative output signal spectrum is shown 617 which also shows the stop band and pass band are also illustrated in FIG. 12.

The tunable edge filter 50 includes a control input 55 that accepts a control signal. The control signal commands the stepper motor 618 which, in turn, moves the beam stopper 612 along direction 613 to thereby adjust the stop band and pass band of the tunable edge filter 50.

The invention is not limited to the specific design of the tunable edge filter 50 shown in FIG. 12. Instead, the invention is intended to utilize any known or future developed tunable edge filter capable of accepting a control signal via a control signal input 55 and, in response, adjusting a stop band and pass band in the wavelength ranges of interest. The control signal may be supplied by a manual adjustment mechanism accessible by a technician or from a control device such as a conventional network management system adapted to generate such a control signal.

The WDM ring 10 of inventive system 2 also includes an optical amplifier 20. Although two such amplifiers 20 are shown only one is necessary. As mentioned above, it is the amplification along a recirculation path of a partially populated system that leads to a problem solved by the invention. Thus, at least one segment of the system 2 should have an optical amplifier 20. Optical amplifier 20 is also a conventional element and includes any device that has the ability to increase the signal strength of plural WDM channels without requiring an optical to electrical conversion. Typical non-limiting examples include the EDFA (erbium doped fiber amplifier), EDWA (erbium doped waveguide amplifier), other rare earth or otherwise optically active material doped amplifiers, Raman amps, etc.

Figure 3:
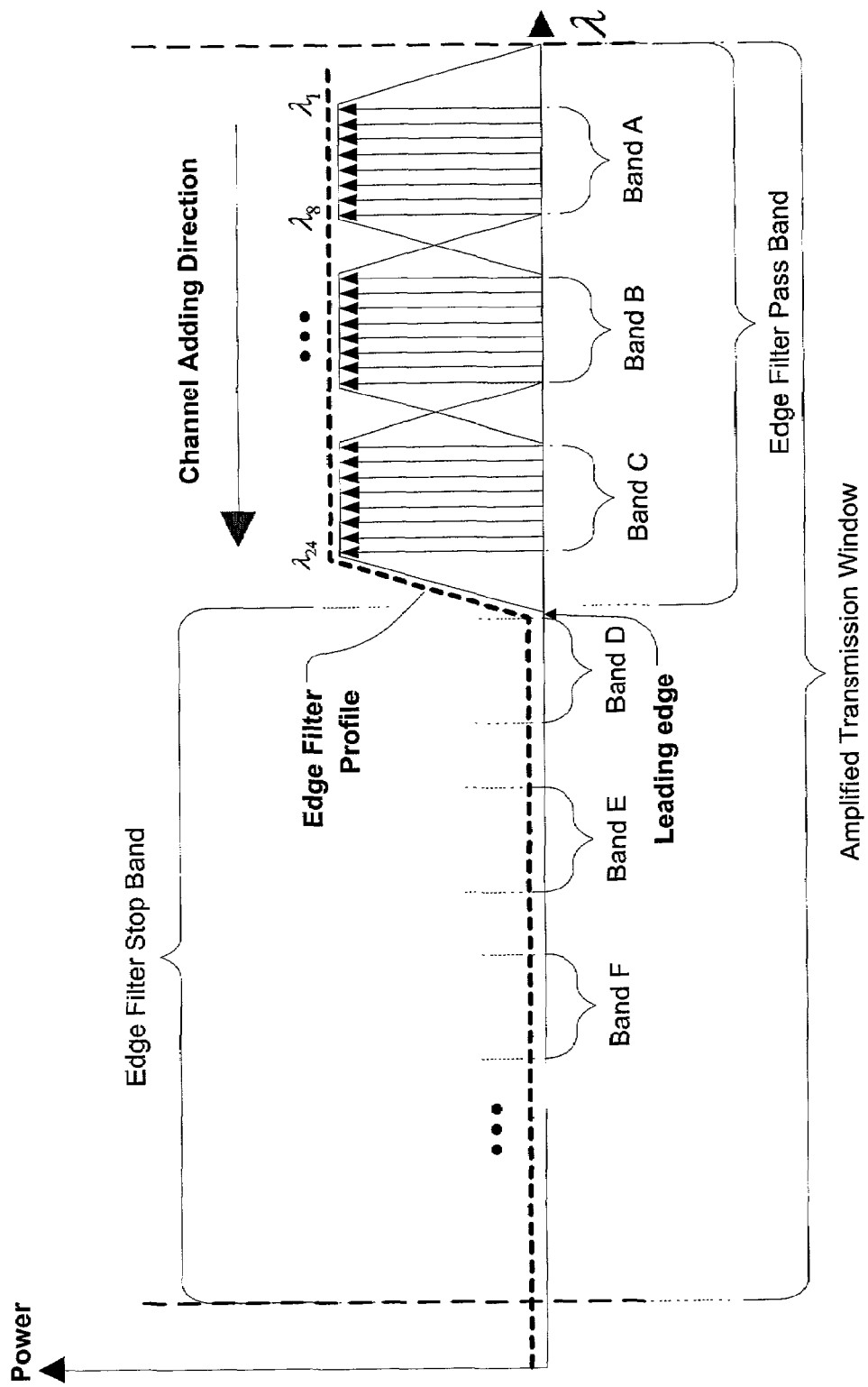
FIG. 3 is a graph of wavelength versus power illustrating the wavelength assignment method and edge filter tuning concepts of the invention.

FIG. 3 further illustrates the concepts of the invention by showing a graph of power versus wavelength for the WDM channel bands. The exemplary system 2 corresponding to the graph of FIG. 3, includes blocking filters 30 each of which drops a band of 8 contiguous channels. FIG. 3 illustrates this channel band drop architecture by showing bands A, B, C and D each of which includes 8 channels as indicated by the arrows and wavelength numbers ($\lambda_1 \rightarrow \lambda_{24}$). The bands A, B, C and D correspond to channel bands of the WDM signal traveling on the WDM system 2.

Preferably, there is a guard band separating adjacent channel bands (e.g. the space between Band A and Band B). In a fully populated system, the bands (A, B, C, . . . ) substantially cover the entire usable bandwidth of the amplifier 20 and hence ring lasing or ASE peaking is not an issue. However, in partially populated systems where one or more of the bands and the associated blocking filter 30 is not present, a part of amplifier ASE is not blocked and depending on such factors as amplifier ripple and tilt there is a possibility of ASE peaking or ring lasing occurring. The invention operates as follows in order to block any unused channel band wavelengths in the system and thereby prevent ASE peaking and ring lasing.

In general, the invention utilizes the technique of populating the blocking filters 30 on the ring 10 from one edge of the amplifier bandwidth to the other edge. This could be from the short wavelength edge to the long wavelength edge or vice versa. This is diagrammatically indicated in FIGS. 3, 4 and 6 with an arrow labeled as the "channel adding direction." This channel band assignment method works as long as the blocking filters 30 are deployed in a sequential manner in the ring 10.

The physical placement of blocking filters 30 with respect to the ring architecture 2 is not dispositive. Indeed, the order shown in FIG. 2 (A then B then C then D in a clockwise direction around the ring) is purely for ease of illustration. It is the order of channel assignment and deployment that is a dispositive and inventive factor that is utilized to advantage.

When decommissioning a channel from the network, the blocking filters 30 are depopulated in the reverse order as diagrammatically indicated in FIGS. 5 and 6 with an arrow labeled as the "channel deleting direction." Further details of these figures will be discussed below in relation to the flowcharts.

The amplified transmission window, as further illustrated in FIG. 3, may be utilized as the reference to assign channel bands. The amplified transmission window may simply be the amplifier 20 bandwidth. The amplified transmission window may be further refined to account for the portion of the spectrum that incurs amplified transmission in a recirculation path and accounts for the transmission window(s) of the optical transmission media (fiber, connectors, nodes) carrying the WDM signal in addition to the bandwidth(s) of one or more amplifiers 20 on the network.

As further shown in FIG. 3, the tunable edge filter 50 has an associated edge filter profile composed of an edge filter stop band and an edge filter pass band. In general, the tunable edge filter 50 limits the bandwidth of amplified transmission window of the ring to just the part of the bands that are being used and blocks the bands that are unused.

The inventive process generally operates by assigning a first group of channels to a first channel band occupying a first edge portion of the amplified transmission window. For example, channel band A is assigned to the right edge (longest wavelength portion) of the amplified transmission window as shown in FIG. 3. A second group of channels may be assigned to a second channel band B substantially adjacent (a guard band may be present as mentioned above) to the first channel band A in a channel adding direction. The channel adding direction is quite clear in FIG. 3 and subsequent channel assignments will occur in sequence along this direction as shown and as further illustrated in FIG. 4.

The assignment of a second or subsequent channel band calls for adjusting the tunable edge filter 50 such that a stop band of the tunable edge filter substantially blocks ASE wavelengths of unassigned channel bands. As shown in FIG. 3, the spectrum of the amplified transmission window includes unassigned channel bands D, E, and F. The tunable edge filter 50 is preferably adjusted so that the wavelengths of the unassigned channel bands are blocked such that any ASE power in the unassigned bands is also blocked.

Figure 7:
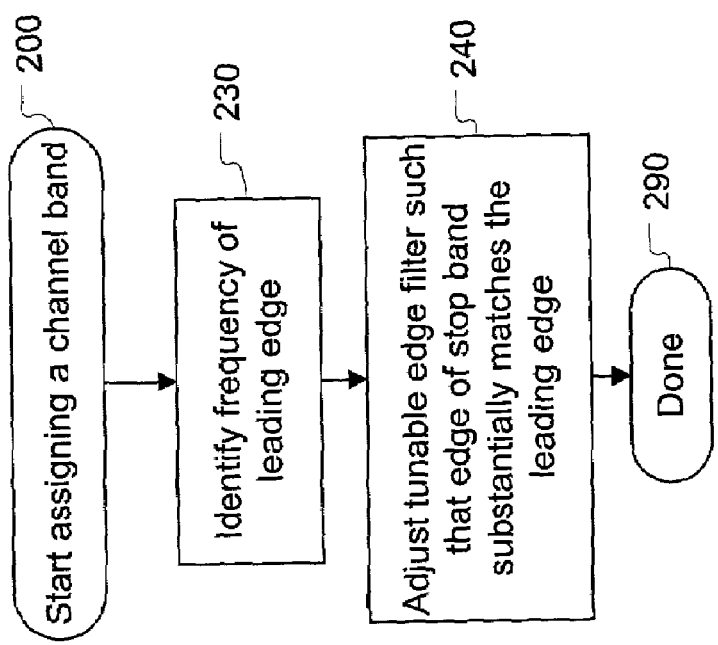
FIG. 7 is a high level flowchart implementing the inventive wavelength assignment method and edge filter tuning for the addition of a new channel band.

FIG. 7 illustrates a formal process for assigning a channel band to the system 2. Starting (200) the process of assigning a channel band may occur whenever a network engineer or other person desires to add a channel band to a partially populated system 2. The channel band assigning process includes the addition of a blocking filter 30 to the network for dropping the channel band being assigned and continues by identifying (230) the frequency of the leading edge. The leading edge is shown in FIG. 3 and may include the wavelength of the channel at the outer limit of the assigned channel bands (e.g. in FIG. 3 the frequency of $\lambda_4$) and the bandwidth of that channel (WDM channels are often referred to in terms of the center wavelength and have an associated bandwidth albeit relatively narrow). The leading edge may also account for the shape of the edge filter profile so as to not attenuate the assigned channel band with any portion of the tunable edge filter stop band. The leading edge may also account for any guard band that may be present. The leading edge may be identified (230) manually by a technician surveying the system or by referring to a channel information database 80 as discussed in more detail below in relation to FIGS. 9 and 10.

The inventive process may then adjust (240) the tunable edge filter such that the edge of the stop band substantially matches the leading edge. This is illustrated by comparing FIGS. 3 and 4. FIG. 4 adds two channel bands (D and E) to the existing channel bands (A, B and C) illustrated in FIG. 4. As can be seen the stop band of the edge filter is adjusted such that it substantially matches the leading edge of the newest channel band (E). The adjusting (240) may be performed manually by a technician supplying the control signal but it is preferred that the control signal be fed to the control input 55 of the tunable edge filter 50 from a node or network manager 70 as further discussed in relation to FIGS. 9 and 10. The process is then finished (290) the channel band assignment process.

Figure 8:
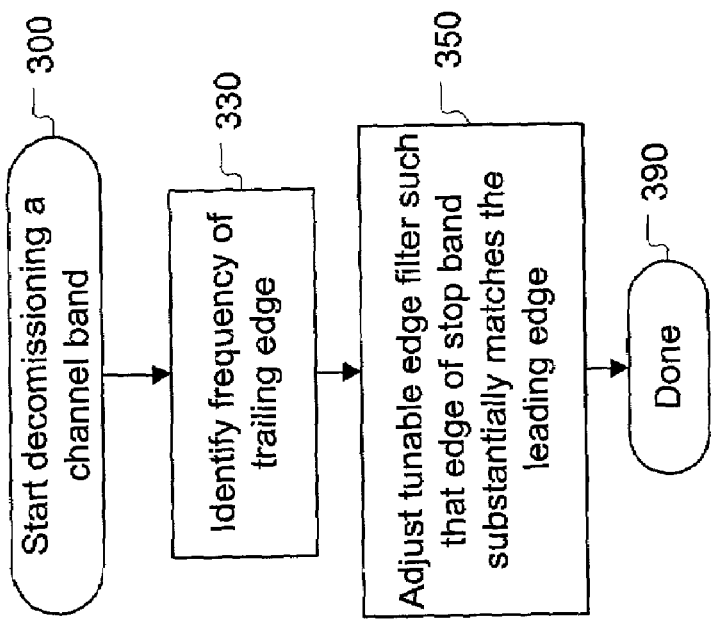
FIG. 8 is a high level flowchart implementing the inventive wavelength assignment method and edge filter tuning for the decommissioning of an existing channel band.

FIGS. 5 and 8 illustrates a channel band decommissioning process. Starting (300) the decommissioning process may occur whenever a network engineer or other person desires to decommission a channel band from system 2. The process may also start (300) at the initiation of a network manager 70 as further discussed below in relation to FIGS. 9 and 11. Decommissioning is a distinct concept from dropping channels. The decommissioning process involves adjustments to the network such that a particular channel band is no longer present on the system 2. This process starts (300) by removing (depopulating) one of the blocking filters 30 (the one responsible for dropping the channel being decommissioned) and continues by identifying (230) the frequency of the trailing edge.

The trailing edge is shown in FIG. 5 is generally the shortest wavelength of the channel band(s) remaining after decommissioning. In the illustrations of FIGS. 4 and 5 channel band E is being decommissioned and the trailing edge of the remaining channels is $\lambda_{32}$. Like the leading edge, the trailing edge may include the wavelength of the channel at the outer limit of the assigned channel bands (after decommissioning) and the bandwidth of that channel (WDM channels are often referred to in terms of the center wavelength and have an associated bandwidth albeit relatively narrow). The trailing edge may also account for the shape of the edge filter profile so as to not attenuate the remaining, assigned channel band(s) with any portion of the tunable edge filter stop band. The trailing edge may also account for any guard band that may be present. The trailing edge may be identified (330) manually by a technician surveying the system or by a network manager 70 referring to a channel information database 80 as discussed in more detail below in relation to FIGS. 9 and 10.

The inventive process may then adjust (350) the tunable edge filter such that the edge of the stop band substantially matches the trailing edge. This is illustrated by comparing FIGS. 4 and 5. FIG. 5 decommissions channel band E with respect to FIG. 4. As can be seen the stop band of the tunable edge filter 50 is adjusted such that it substantially matches the trailing edge of the remaining channel band (D). The adjusting (350) may be performed as described above in relation to step 240. The process is then finished (390) the channel band decommissioning process.

FIG. 6 illustrates an alternative to the invention. Namely, the channel adding direction of the previous figures is from long to short wavelengths. FIG. 6 reverses this direction and adds channels from the short to the long wavelengths. The important point is that the channels are assigned beginning from one edge portion (short or long) of the amplified transmission window and moving towards the other edge portion (long or short) in a sequential manner. Likewise, the channel bands are decommissioned from one end of the amplified transmission window to the other as indicated by the channel deleting direction shown in FIGS. 6 and 5. The choice between the options may be affected by the use of a service channel.

As discussed below in more detail, service channels are conventionally used to transmit housekeeping data around the network. Typical wavelengths for service channels include 1625 nm and 1310 nm. The amplified transmission window may center around, for example, 1550 nm. If a 1625 nm service channel is used then the tunable edge filter 50 should have a pass band that encompasses this wavelength. The edge filter profile shown in FIG. 6 may not be appropriate for a 1625 nm service channel in this example since the stop band overlaps the service channel wavelength. In this example, an edge filter profile like the one shown in FIGS. 4–6 is preferred.

Figure 9:
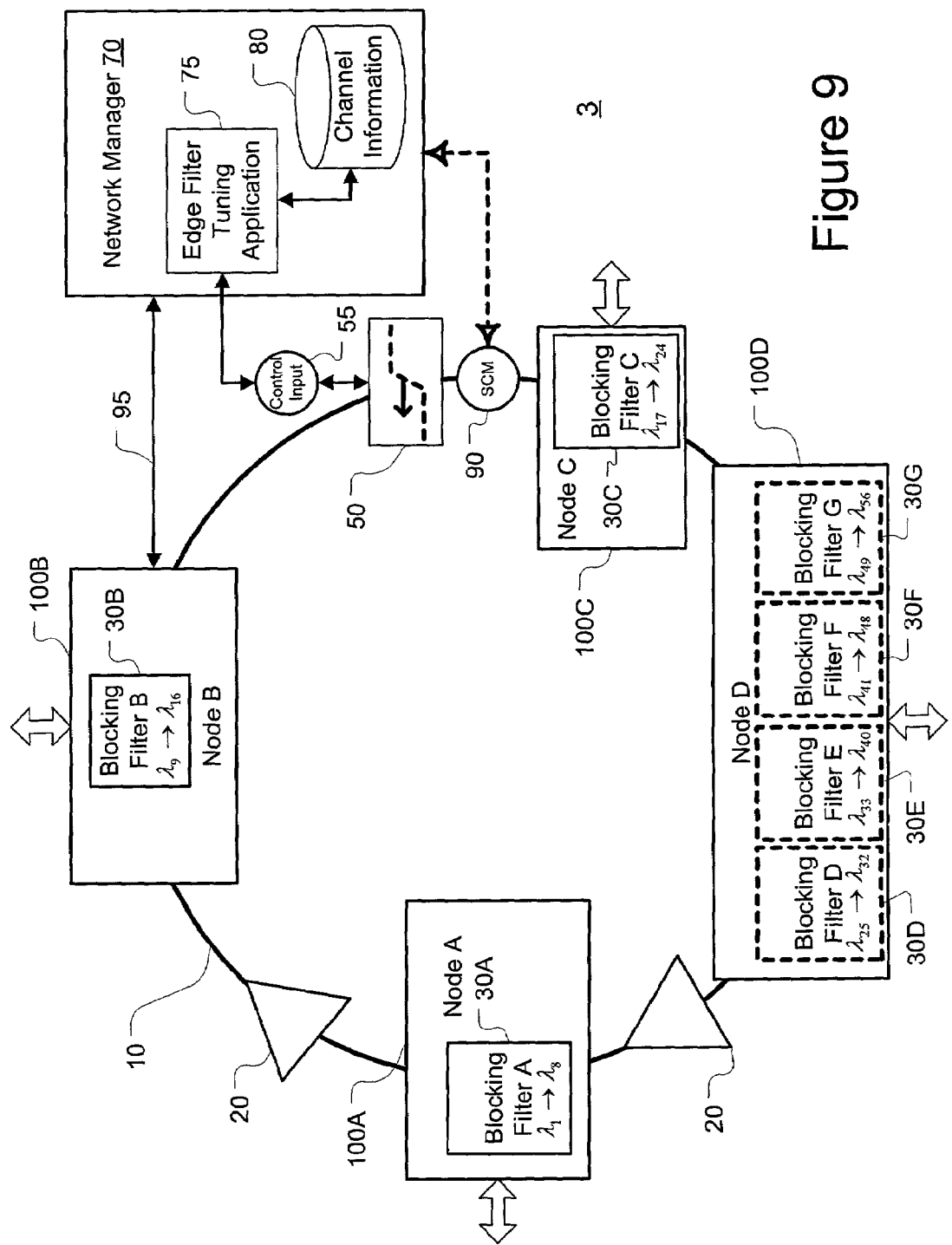
FIG. 9 is a block diagram of another WDM system according to the invention having a ring architecture.

FIG. 9 illustrates a second embodiment of the inventive WDM transmission system 3 including nodes A, B, C, and D (100A, 100B, 100C, and 100D) in which lengths of optical fiber 10 connect the nodes in a ring-based architecture. Many of the components are similar or identical to those shown in system 2 illustrated in FIG. 2 and described above in detail. Thus, only the differences will be explained further.

One such difference is the addition of a network manager 70. The network manager 70 may be based on conventional network management software applications that monitor and control WDM optical networks. An example of a system having such a network manager is shown in U.S. Pat. No. 6,163,392. In essential part, the network manager 70 is a software application adapted to the functionality of the invention, running on a conventional microprocessor based computer architecture and having the ability to communicate with the system 3.

Specifically, the network manager 70 may interface with a service channel modem (SCM) 90 which provides an optical communication link with the nodes 100 over a service channel. A service channel, usually outside the information bearing or payload channel bandwidth, is typically included in optical systems for carrying system housekeeping information, for example network monitoring and control signals as well as telemetry information, to and/or from nodes in the network. Because the service channel wavelength is outside the payload channel bandwidth, separate components configured to receive and process the service channel are typically required. Examples of known service channels and related components for handling them are described in U.S. Pat. Nos. 5,532,864; 5,798,855; and 6,141,125.

Alternatively or in conjunction therewith, the network manager 70 may communicate with the nodes (e.g. node 110B) using an electrical signal carried over, for example, an overlay IP-based network 95. With one or more of these electrical and communication pathways, the network manager 70 may gather information about the network 3 such as which channel bands have been assigned, which are being decommissioned, and the frequencies of at least the leading and trailing edges of the channel bands. This information may be stored in channel information database 80 which is essentially a memory device operatively connected to the network manager 70.

The network manager 70 also includes an edge filter tuning application 75 which may access the channel information database 80 and adjust the tunable edge filter 50 via control input 55. The specific functions performed by the edge filter tuning application 75 are described in relation to the flowcharts of FIGS. 10 and 11.

As further shown in FIG. 9, some of the nodes may include more than one blocking filter. For example, node D (100D) includes blocking filters 30D, 30E, 30F, and 30G. More accurately, node D includes the ability to add blocking filters 30D, 30E, 30F, and 30G as indicated by the dotted lines used to illustrate these filters. Thus, the system 3 is a partially populated system. Moreover, it is generally preferable from a system control standpoint to have the ability to switch blocking filters into and out of the WDM signal path under the control of network manager 70 and via the service channel and/or the electrical network 95.

FIG. 10 illustrates the processes performed by the edge filter tuning application 75 of the network manager 70 when assigning a channel band. Starting (400) the process of assigning a channel band may at the initiation of a network manager 70 in response to a request from an operator or automatically. The network manager 70 then determines (410) the existing channel bands. This may be accomplished by referred to the channel information database 80 which is a repository of channel information. The channel information may be gathered by the network manager 70 by communicating with the nodes 100 via the service channel. Once the existing channel bands are determined the network manager selects (420) the next blocking filter 300 in the channel adding direction. This may be accomplished by sending a control signal over the service channel to the appropriate node 100 having the next selectable blocking filter 30 in the sequence (channel adding direction).

The network manager 70 also identifies (430) the frequency of the leading edge by referring to the channel information database 80 which stores the leading and trailing frequencies of channel bands or at least keeps track of a current leading frequency. The network manager may then adjust (440) the tunable edge filter 50 such that the edge of the stop band substantially matches the leading edge by sending a control signal to tunable edge filter 50 via control signal input 55 (e.g. optically via the SCM 90 or electrically using a direction connection as shown or via an electrical network 95).

Optionally, the network manager 70 may also enable the launch of channel(s) in the channel band of the selected blocking filter 30. An enabling/disabling mechanism may be useful to prevent channel launch until the system is properly tuned and stabilized. The process is then finished (490) an iteration the channel band assignment process. Of course, the process may be repeated to assign additional channel band(s).

FIG. 11 illustrates a channel band decommissioning process performed by the network manager 70. Starting (500) the decommissioning process may at the initiation of a network manager 70 in response to a request from a user or automatically. After determining (510) which channel bands currently exist in the system 3, the network manager deselects (520) an appropriate one of the blocking filters 30 (the one responsible for dropping the channel being decommissioned) and continues by identifying (530) the frequency of the trailing edge. The determining (510) and identifying (530) steps are largely the same as steps 410 and 440 with the exception being the identification of a trailing edge rather than a leading edge. The deselecting (520) is generally the reverse process of selecting (420). As mentioned above, it is generally preferable from a system control standpoint to have the ability to switch blocking filters into and out of the WDM signal path under the control of network manager 70 and via the service channel and/or the electrical network 95 and the deselecting (520) may utilize such a technique.

The network manager 70 may then adjust (550) the tunable edge filter 50 such that the edge of the stop band substantially matches the trailing edge. The control signal input 55 is used for this purpose and is fed a control signal by the network manager 70 as shown. The process is then finished (590) the channel band decommissioning process.

Figure 13:
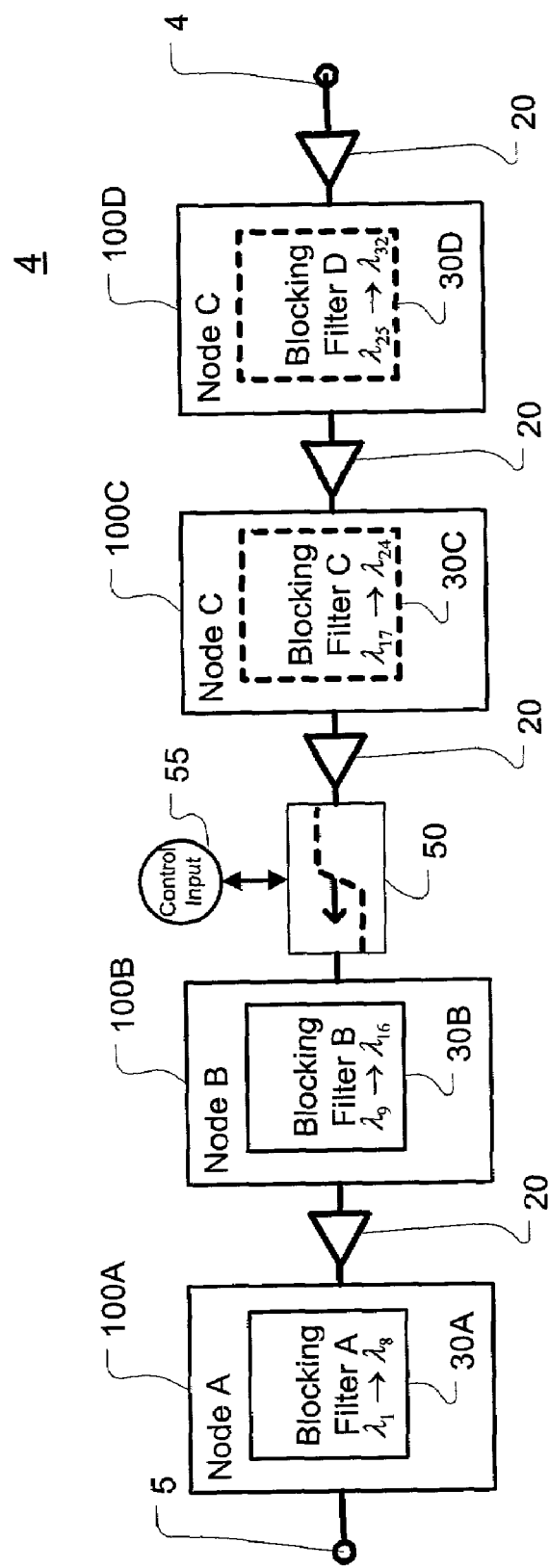
FIG. 13 is a block diagram of a linear WDM system according the invention and showing further applicability of the inventive concepts.

FIG. 13 illustrates a third embodiment of the inventive WDM transmission system 4 including nodes A, B, C, and D (100A, 100B, 100C, and 100D) in which lengths of optical fiber 10 connect the nodes in a linear architecture. Many of the components are similar or identical to those shown in system 2 illustrated in FIG. 2 and described above in detail. Thus, only the differences will be explained further.

The linear WDM transmission system 4 shown in FIG. 13 may be part of a much larger network as indicated by the connection points 4 and 5. Like the ring systems 2 and 3, linear system 4 may be a "partially populated system" in which less that the total number of channel bands and corresponding blocking filters 30 are present. This is illustrated in FIG. 13 where the flocking filters 30C and 30D are shown in dotted lines indicating that it has not been installed or otherwise switched into the transmission path. Thus, the corresponding channel bands (e.g. $\lambda_{27} \rightarrow \lambda_{24}$ and $\lambda_{25} \rightarrow \lambda_{32}$) are not blocked and ASE from the amplifiers 20 may experience peaking and interfere with system 4 performance. The invention solves this problem by limiting the ASE bandwidth using the same techniques of channel assignment, adjusting the tunable edge filter 50 and channel decommissioning that are described above in detail.

The invention has been described with reference to particular examples but is not limited thereto. For example, the number of channels per channel band is not limited to eight per band and can include any number from 1 to N. Generally, however, plural channels per band are preferred to minimize express loss. Furthermore, the channel bands need not have the same number of channels per band such that one channel band may have eight channels while another may have 16 channels. Still further the number of nodes 100 may be varied and is not limited to the illustrative examples shown in the figures.

The invention being thus described, it will be obvious that the same may be varied in many ways. Such variations are not to be regarded as departure from the spirit and scope of the invention, and all such modifications as would be obvious to one skilled in the art are intended to be included within the scope of the following claims.

The invention claimed is:

1. A wavelength division multiplexed optical communication system having a transmission path carrying a WDM signal with a plurality of channel bands, comprising:

an optical amplifier optically coupled to the transmission path of the system and having an associated amplified transmission window;

a plurality of optical add-drop multiplexers each including a drop filter with an associated drop band capable of dropping at least one channel band from the WDM signal;

said optical add-drop multiplexers injecting the channel bands into said fiber optic network such that the injected channel bands occupy a first edge portion of the amplified transmission window;

a tunable edge filter optically coupled to the transmission path, said tunable edge filter having a pass band and a stop band;

a network manager operatively connected to said tunable edge filter, said network manager adjusting said tunable edge filter such that the stop band of the tunable edge filter substantially blocks ASE wavelengths of unoccupied channel bands;

said network manager assigning a first group of channels to a first channel band occupying the first edge portion of the amplified transmission window;

said network manager assigning a second group of channels to a second channel band substantially adjacent to the first channel band in a channel adding direction, wherein the channel adding direction is away from the first edge portion of the amplified transmission window;

said network manager adjusting a tunable edge filter in the transmission path such that a stop band of the tunable edge filter substantially blocks ASE wavelengths of unassigned channel bands;

said network manager assigning an N-th group of channels to an Nth channel band substantially adjacent to the (N−1)th channel band in a channel adding direction;

said network manager adjusting the tunable edge filter in the transmission path such that the stop band of the tunable edge filter substantially blocks ASE wavelengths of unassigned channel bands;

said network manager decommissioning the Nth channel band, the Nth channel band being substantially adjacent to an (N−1)th channel band in a channel deleting direction, wherein the channel deleting direction is towards the first edge portion of the amplified transmission window; and said network manager adjusting the tunable edge filter in the transmission path to expand a stop band of the tunable edge filter to substantially block ASE wavelengths of the decommissioned Nth channel band.

2. The wavelength division multiplexed optical communication system according to claim 1, further comprising:

a memory device operatively connected to said network manager, said memory device storing channel information including frequency information for the injected channel bands;

said network manager identifying a frequency of a leading edge of the injected channel bands; and said network manager adjusting the tunable edge filter such that an edge of the stop band substantially matches the frequency of the leading edge.

3. The wavelength division multiplexed optical communication system according to claim 1, further comprising:

a memory device operatively connected to said network manager, said memory device storing channel information including frequency information for the assigned channel bands;

said network manager accessing said memory device to identify a frequency of a leading edge of the second channel band; and said network manager adjusting the tunable edge filter in the transmission path such that an edge of the stop band substantially matches the frequency of the leading edge identified in said identifying step.

4. The wavelength division multiplexed optical communication system according to claim 1, further comprising:

a memory device operatively connected to said network manager, said memory device storing channel information for the assigned channel bands;

said network manager accessing said memory device to determine which channel bands have already been assigned; and said network manager controlling one of said optical add-drop multiplexers to select a next drop filter in a channel adding direction to enable dropping of the second channel band.

5. The wavelength division multiplexed optical communication system according to claim 1,
said network manager identifying a frequency of a trailing edge of the first channel band; and
said network manager adjusting the tunable edge filter in the transmission path such that an edge of the stop band substantially matches the frequency of the trailing edge.

6. The wavelength division multiplexed optical communication system according to claim 1, wherein the WDM system is a ring-based system and the transmission path is recirculation path.

7. The wavelength division multiplexed optical communication system according to claim 1, wherein the WDM system is a linear system.

8. A wavelength assignment method that suppresses ASE on a WDM system having a transmission path with an amplified transmission window, comprising:
assigning a first group of channels to a first channel band occupying a first edge portion of the amplified transmission window;
assigning a second group of channels to a second channel band substantially adjacent to the first channel band in a channel adding direction, wherein the channel adding direction is away from the first edge portion of the amplified transmission window;
adjusting a tunable edge filter in the transmission path such that a stop band of the tunable edge filter substantially blocks ASE wavelengths of unassigned channel bands;
assigning an N-th group of channels to an Nth channel band substantially adjacent to the (N−1)th channel band in a channel adding direction;
adjusting the tunable edge filter in the transmission path such that the stop band of the tunable edge filter substantially blocks ASE wavelengths of unassigned channel bands;
decommissioning the Nth channel band, the Nth channel band being substantially adjacent to an (N−1)th channel band in a channel deleting direction, wherein the channel deleting direction is towards the first edge portion of the amplified transmission window; and
adjusting the tunable edge filter in the transmission path to expand a stop band of the tunable edge filter to substantially block ASE wavelengths of the decommissioned Nth channel band.

9. The wavelength assignment method according to claim 8, said assigning a second group of channels including:
identifying a frequency of a leading edge of the second channel band; and
adjusting the tunable edge filter in the transmission path such that an edge of the stop band substantially matches the frequency of the leading edge identified in said identifying step.

10. The wavelength assignment method according to claim 8, further comprising:
assigning a third group of channels to a third channel band substantially adjacent to the second channel band in a channel adding direction; and
adjusting the tunable edge filter in the transmission path such that the stop band of the tunable edge filter substantially blocks ASE wavelengths of unassigned channel bands.

11. The wavelength assignment method according to claim 10, said assigning a second group of channels including:
identifying a frequency of a leading edge of the third channel band; and
adjusting the tunable edge filter in the transmission path such that an edge of the stop band substantially matches the frequency of the leading edge identified in said identifying step.

12. The wavelength assignment method according to claim 8, said assigning an N-th group of channels including:
identifying a frequency of a leading edge of the (N−1)th channel band;
adjusting the tunable edge filter in the transmission path such that an edge of the stop band substantially matches the frequency of the leading edge identified in said identifying step.

13. The wavelength assignment method according to claim 8, said assigning an N-th group of channels including:
determining which channel bands have already been assigned by said assigning steps; and
selecting a next drop filter in a channel adding direction to enable dropping of the N-th channel band.

14. The wavelength assignment method according to claim 13,
wherein said selecting is performed by populating the WDM system with the selected next drop filter.

15. The wavelength assignment method according to claim 13,
wherein said selecting is performed by switching the selected next drop filter into a signal pathway of the WDM system.

16. The wavelength assignment method according to claim 8, further comprising:
enabling launch of the second group of channels after performing said adjusting step.

17. The wavelength assignment method according to claim 8, wherein the WDM system is a ring-based system and the transmission path is recirculation path.

18. The wavelength assignment method according to claim 8, wherein the WDM system is a linear system.

19. A wavelength decommissioning method that suppresses ASE on a WDM system having a transmission path with an amplified transmission window transmitting a plurality of channels bands assigned to a first edge portion of the amplified transmission window, the method comprising:
decommissioning a first channel band from among the plurality of channel bands, the first channel band being substantially adjacent to a second channel band in a channel deleting direction, wherein the channel deleting direction is towards the first edge portion of the amplified transmission window;
adjusting a tunable edge filter in the transmission path such to expand a stop band of the tunable edge filter to substantially block ASE wavelengths of the decommissioned first channel band;
decommissioning a second channel band from among the plurality of channel bands, the second channel band being substantially adjacent to the first channel band in a channel deleting direction, wherein the channel deleting direction is towards the first edge portion of the amplified transmission window;
adjusting a tunable edge filter in the transmission path such to expand a stop band of the tunable edge filter to substantially block ASE wavelengths of the decommissioned second channel band;

decommissioning an Nth channel band substantially adjacent to the (N−1)th channel band in a channel deleting direction; and adjusting the tunable edge filter in the transmission path such that the stop band of the tunable edge filter substantially blocks ASE wavelengths of decommissioned channel bands.

20. The wavelength decommissioning method according to claim 19, said decommissioning a first channel band including:

identifying a frequency of a trailing edge of the first channel band; and adjusting the tunable edge filter in the transmission path such that an edge of the stop band substantially matches the frequency of the trailing edge identified in said identifying step.

21. The wavelength decommissioning method according to claim 19, said decommissioning a first channel band including:

identifying a frequency of a trailing edge of the second channel band; and adjusting the tunable edge filter in the transmission path such that an edge of the stop band substantially matches the frequency of the trailing edge identified in said identifying step.

22. The wavelength decommissioning method according to claim 19, further comprising:

determining which channel bands have been decommissioned by said decommissioning steps; and deselecting drop filters corresponding to the decommissioned channel bands.

23. The wavelength decommissioning method according to claim 19, further comprising:

disabling launch of a first group of channels in the decommissioned first channel band.

24. The wavelength decommissioning method according to claim 19, wherein the WDM system is a ring-based system and the transmission path is recirculation path.

25. The wavelength decommissioning method according to claim 19, wherein the WDM system is a linear system.

* * * * *